United States Patent
Dhanabalan (10) Patent No.: US 9,819,591 B2
(45) Date of Patent: Nov. 14, 2017

(54) SYSTEM AND METHOD OF PROVIDING COMPRESSION TECHNIQUE FOR JITTER SENSITIVE APPLICATION THROUGH MULTIPLE NETWORK LINKS

(71) Applicant: Citrix Systems, Inc., Fort Lauderdale, FL (US)

(72) Inventor: Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 107 days.

(21) Appl. No.: 15/012,488

(22) Filed: Feb. 1, 2016

(65) Prior Publication Data

US 2017/0222930 A1     Aug. 3, 2017

(51) Int. Cl.
*H04L 12/801*     (2013.01)
*H04L 29/06*     (2006.01)
*H04L 12/26*     (2006.01)

(52) U.S. Cl.
CPC ............ *H04L 47/12* (2013.01); *H04L 43/087* (2013.01); *H04L 69/04* (2013.01)

(58) Field of Classification Search
CPC ........ H04L 47/12; H04L 43/087; H04L 69/04
USPC ....................................................... 370/230
See application file for complete search history.

(56) References Cited

U.S. PATENT DOCUMENTS

| | | | | |
|---|---|---|---|---|
| 2003/0067872 A1* | 4/2003 | Harrell | ............ | H04L 29/06027 370/229 |
| 2004/0136379 A1* | 7/2004 | Liao | ........................ | H04L 47/10 370/395.21 |
| 2007/0147366 A1* | 6/2007 | Babbar | ............ | H04L 29/06027 370/389 |
| 2011/0310738 A1* | 12/2011 | Lee | ........................ | H04L 47/12 370/235 |
| 2012/0042032 A1* | 2/2012 | Fredette | ................ | G06F 15/167 709/214 |
| 2013/0078994 A1* | 3/2013 | Jouin | ..................... | G06F 3/1438 455/426.1 |
| 2014/0309864 A1* | 10/2014 | Ricci | ..................... | H04W 48/04 701/36 |
| 2016/0105353 A1* | 4/2016 | Cociglio | ............. | H04L 43/0829 370/252 |

* cited by examiner

*Primary Examiner* — Stephen J Clawson
(74) *Attorney, Agent, or Firm* — Foley & Lardner LLP; Christopher J. McKenna (57) ABSTRACT

An appliance for providing compression technique for jitter sensitive application through multiple network links is described. The appliance has one or more processors and includes a link quality estimator, a jitterless compressor, and a link switcher. The link quality estimator is configured to measure latency over a first link and a second link, wherein the second link has a longer latency than the first link. The jitterless compressor is configured to accumulate packets for a time period associated with a difference in latency between the second link and the first link, and determine a number of packets based on a packet size associated with the accumulated packets and bandwidth of the first link. The link switcher is configured to acquire the determined number of packets, wherein the determined number of packets have been compressed, transmit a first packet over the second link, and transmit the acquired number of packets over the first link.

20 Claims, 8 Drawing Sheets

SYSTEM AND METHOD OF PROVIDING COMPRESSION TECHNIQUE FOR JITTER SENSITIVE APPLICATION THROUGH MULTIPLE NETWORK LINKS

BACKGROUND

A middlebox is a network appliance that manipulates Internet traffic by optimizing data flow across the network. Middleboxes can be configured as wide area network (WAN) optimizers and can be deployed in pairs across two geographically separated locations to optimize data traffic between the two middleboxes. Middleboxes that perform WAN optimization and virtualization work as a pair of device across two geographically separated offices connected via multiple links of different WAN networks. A middlebox (e.g., an appliance) can tunnel packets across multiple links to other middleboxes to aggregate bandwidth and also to provide compression benefits. To provide compression benefits, packets are held in one appliance, with the data part of the packet being accumulated and compressed via normal compression techniques or through data duplication, and the compressed data being sent on the other side appliance.

For jitter sensitive applications (e.g., real-time service applications, streaming service applications, or video clip applications), it is difficult to provide compression benefits. For example, to provide compression, an appliance accumulates packets for compression, which could forcefully induce jitter into the connection. Since packet flow has to be paused for a certain amount of time to accumulate packets for the compression, jitter could be induced into the connection. This can drastically affect performance of the connection, especially for jitter-sensitive applications that are designed against packet jitter. Hence, these jitter sensitive applications are generally not compressed for performance reason.

SUMMARY

In some aspects, an appliance has one or more processors and includes a link quality estimator, a link quality estimator, and a link switcher. The link quality estimator is configured to measure latency over a first link and a second link, wherein the second link has a longer latency than the first link. The jitterless compressor is configured to accumulate packets for an entire time period or a portion of the entire time period associated with a difference in latency between the second link and the first link, and to determine a number of packets based on a packet size associated with the accumulated packets and bandwidth of the first link. The link switcher is configured to acquire the determined number of packets, wherein the determined number of packets have been compressed, transmit a first packet over the second link, and transmit the acquired number of packets over the first link.

In another aspect, a method of providing compression technique for jitter sensitive application is described. The method can include measuring latency over a first link and a second link, wherein the second link has a longer latency than the first link, accumulating packets for an entire time period or a portion of the entire time period associated with a difference in latency between the second link and the first link, determining a number of packets based on a packet size associated with the accumulated packets and bandwidth of the first link, acquiring the determined number of packets, wherein the determined number of packets have been compressed, transmitting a first packet over the second link, and transmitting the acquired number of packets over the first link.

In yet another aspect, non-transitory computer readable storage medium is described. The storage medium stores a set of instructions that are executable by at least one processor of an appliance to cause the appliance to perform a method of providing compression technique for jitter sensitive application. The method can include measuring latency over a first link and a second link, wherein the second link has a longer latency than the first link, accumulating packets for a time period associated with a difference in latency between the second link and the first link, determining a number of packets based on a packet size associated with the accumulated packets and bandwidth of the first link, acquiring the determined number of packets, wherein the determined number of packets have been compressed, transmitting a first packet over the second link, and transmitting the acquired number of packets over the first link.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide appliances and methods to achieve compression benefits for jitter sensitive applications in a network with multiple network links by utilizing differences in their latency. This can be achieved by holding packets less than or equivalent to the difference in latency across multiple links to provide compression, and thus inducing no additional jitter to the connection.

Figure 1:
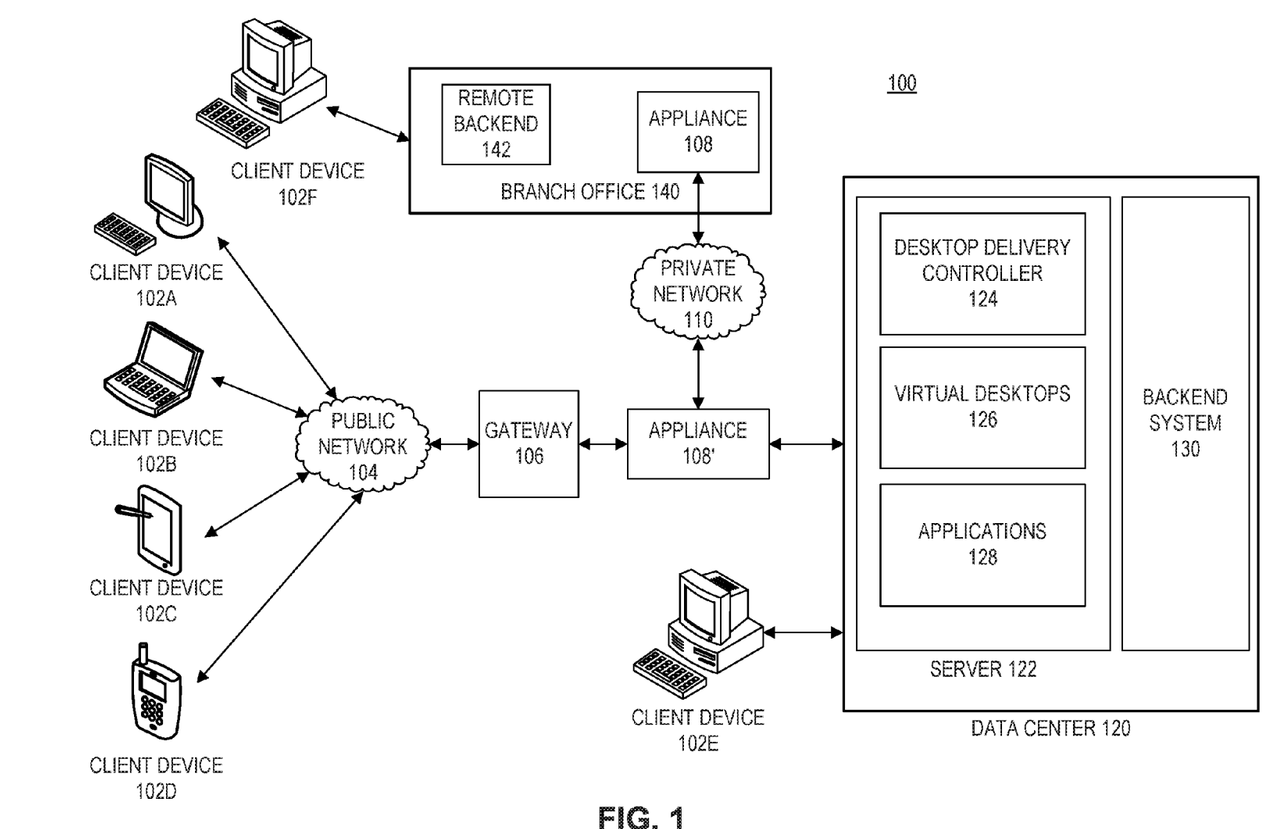
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108 and/or 108', a private network 110, a data center 120, and a branch office 140.

One or more client devices 102 are devices that can acquire remote services from data center 120 through various means. Client devices 102 can communicate with a data center 120 either directly (e.g., client device 102e) or indirectly through a public network 104 (e.g., client devices 102a-d) or a private network 110 (e.g., client device 102f). When client device 102 communicates through public network 104 or private network 110, a communication link can be established. For example, a link can be established by public network 104, gateway 106, and appliance 108', thereby providing a client device (e.g. client devices 102a-d) access to data center 120. A link can also be established by branch office 140 including appliance 108, private network 110, and appliance 108', thereby providing a client device (e.g. client device 102f) access to data center 120. While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device (e.g., wearable or smart watch) that communicates packets to and from data center 120.

Public network 104 and private network 110 can be any type of network such as a WAN, a local area network (LAN), or a metropolitan area network (MAN). As an example, a WAN can be the Internet or the World Wide Web, and a LAN can be a corporate Intranet Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108' and/or data center 120 can understand and vice versa.

Appliance 108 is a device that optimizes WAN traffic by including, for example, a quality of service ("QoS") engine. In some embodiments, appliance 108 optimizes other types of network traffic, such as LAN traffic, MAN traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or Cloud-Bridge™. In some embodiments, appliance 108 can be a virtual appliance. In some embodiments, appliance can be a physical device having multiple instances of virtual machines (e.g., virtual Branch Repeater).

In some embodiments, Appliances 108 can regulate or meter flow of data packets onto WAN link. Appliances 108 can impose transparent, lossless flow control on each segment of a connection: a LAN segment between one or more client devices 102 and appliance 108' in data center 120, and a WAN segment between appliance 108 in branch office 140 and appliance 108' at data center 120, another LAN segment between appliance 108' at data center 120 and a public server (e.g., a web server). Appliances 108 can independently manage flow control and utilization for each segment independently by splitting a connection into three segments. This is important when a connection's speed needs to be ramped up or down to its fair bandwidth share and to ensure maximum advantage is taken of enhanced WAN optimization and compression algorithms Appliance 108 can analyze data packets. For example, appliance 108 can determine whether an application type of the data packets is a jitter sensitive application. Appliance 108 can also measure latency and bandwidth over a first link and a second link, respectively. The second link can have a longer latency than the first link. In order to maintain jitterless packet transfer for the connection, the first packet is sent through link B which has higher latency than link A. Appliance 108 can accumulate packets for an entire time period or a portion of the entire time period associated with a difference in latency between the second link and the first link. Appliance 108 can determine a number of packets based on a packet size associated with the accumulated packets and bandwidth of the first link. Appliance 108 can also compress the determined number of packets by accumulating them for a maximum time of ((Packet size)/bandwidth of the first link)<latency difference between the first link and the second link. Appliance 108 can transmit a first packet over the second link. Appliance 108 can transmit the acquired number of packets over the first link. After transmission, appliance 108 can measure latency over the first link and the second link. Appliance 108 can see the first packet over the second link and the acquired number of packets over the first link arrived at the other appliance 108' at the same time or almost at the same time. This induces no additional jitter or minimum jitter on a system.

In some embodiments, a first appliance (e.g., appliance 108) works in conjunction with or cooperation with a second appliance (e.g., appliance 108') to optimize packets over multiple links. For example, the first appliance can be located between a branch office (e.g., branch office 140) and a WAN connection, while the second appliance can be located between WAN and a corporate LAN (e.g., data center 120).

In some embodiments, the functionality of gateway 106 and appliance 108' can be located in a single physical device. Appliances 108 and 108' can be functionally the same or similar. Moreover, in some embodiments, appliance 108' and gateway 106 can be part of the same device. Appliance 108 is further described below corresponding to FIG. 3.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments data center 120 can include gateway 106, appliance 108', or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). For example, applications 128 can include Microsoft Windows™-based applications and computing resources.

Desktop delivery controller 124 is a device that enables delivery of services, such as virtual desktops 126 to client devices (e.g., client devices 102a-f or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of LAN that is part of the WLAN having data center 120. Branch office 140 can include, among other things, appliance 108 and remote backend 142. In some embodiments, appliance 108 can sit between branch office 140 and private network 110. As stated above, appliance 108 can work with appliance 108'. Remote backend 142 can be set up in similar manner as backend system 130 of data center 120. Client device 102f can be located on-site to branch office 140 or can be located remotely from branch office 140.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2A:
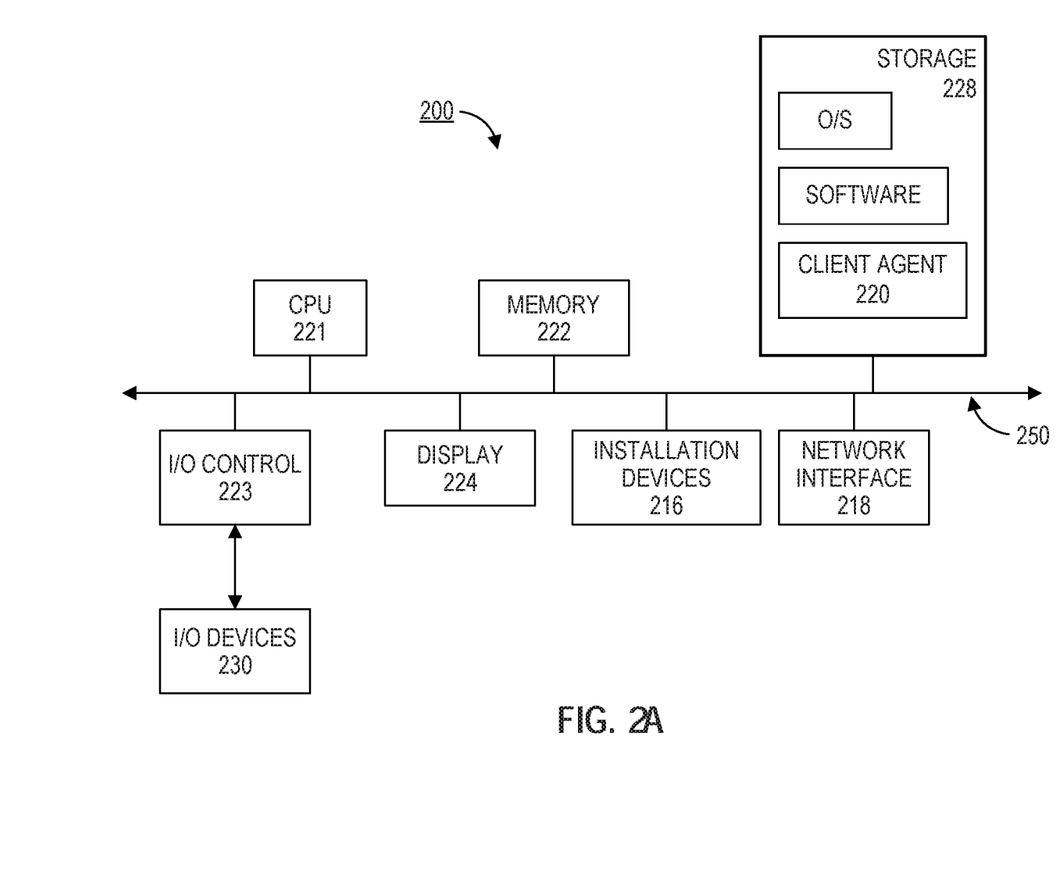
FIGS. 2A-2B are block diagrams of an exemplary computing device, consistent with embodiments of the present disclosure.
Figure 2B:
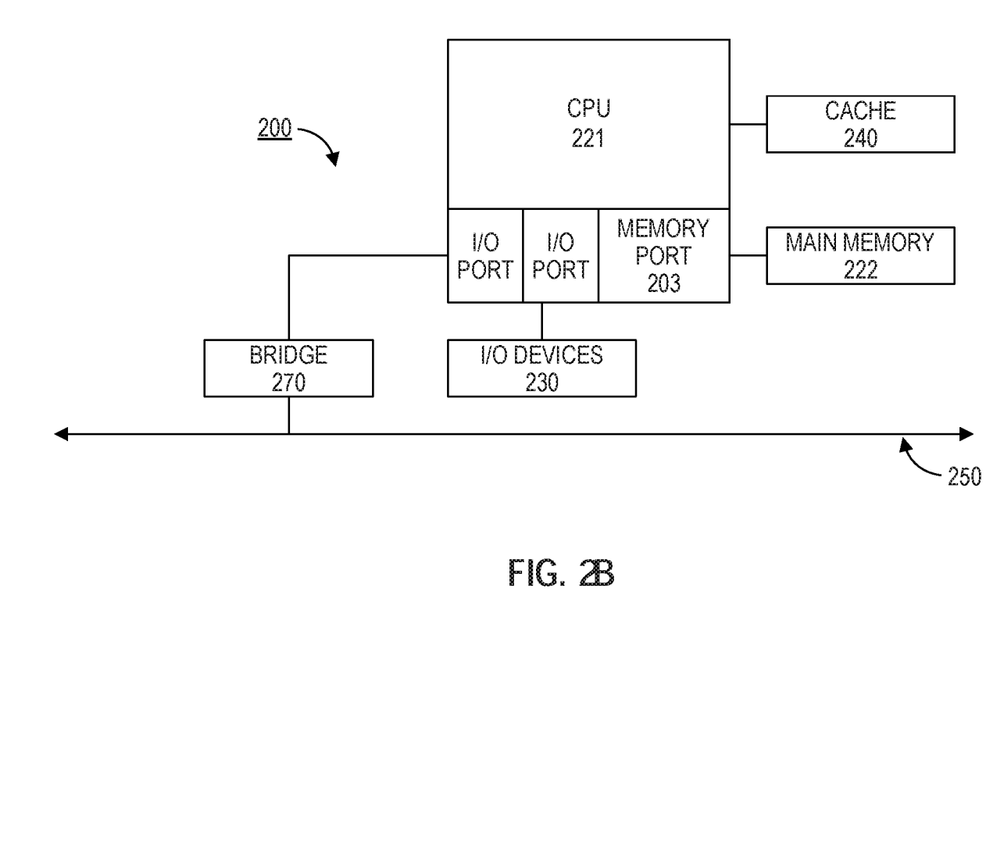

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card, a hard-drive, or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of link including, but not limited to, standard telephone lines, LAN or WAN links (e.g., 802.11, T1, T3, X.25), broadband link (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3:
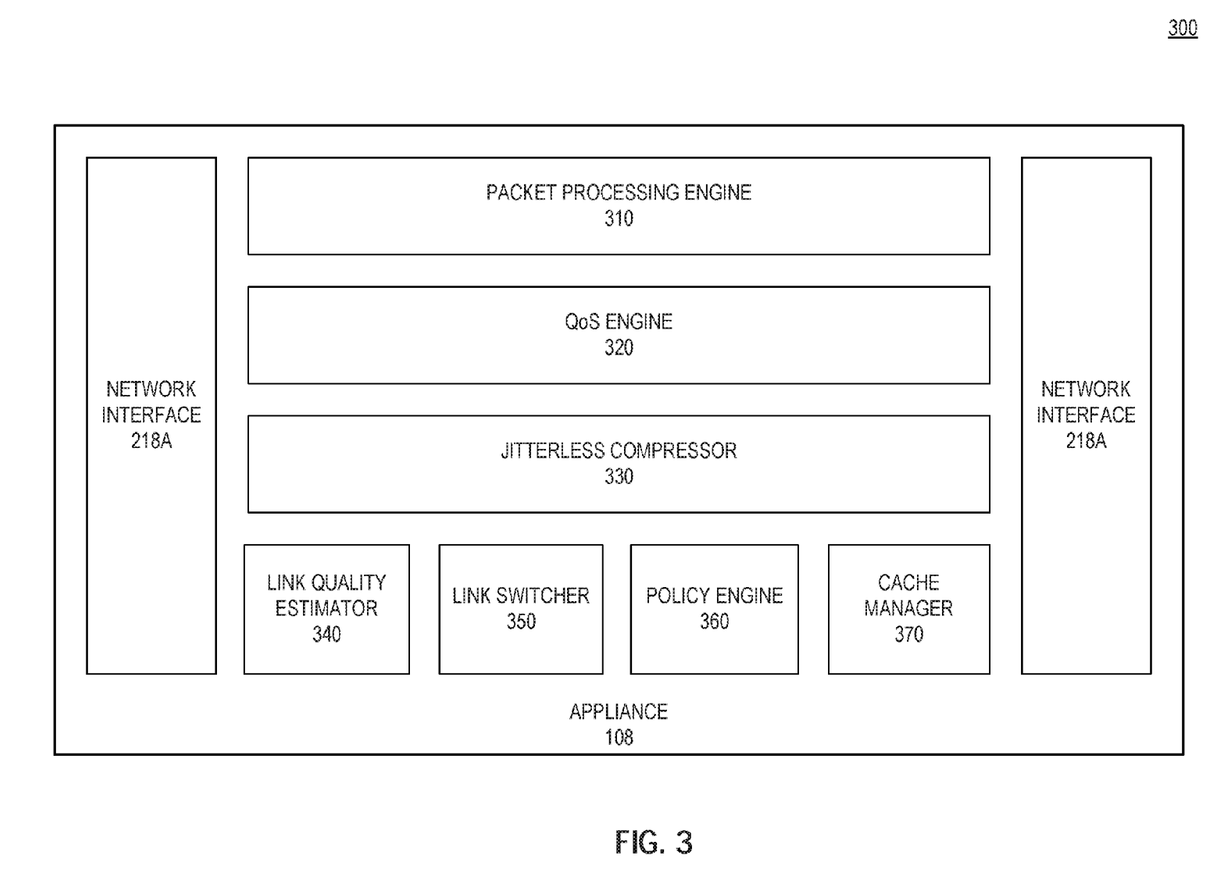
FIG. 3 is a block diagram of an exemplary appliance illustrated in FIG. 1, consistent with embodiments of the present disclosure.

FIG. 3 is a block diagram of an exemplary appliance 108 and/or 108' illustrated in FIG. 1, consistent with embodiments of the present disclosure. Appliance 108 can include one or more network interfaces 218A-N consistent with network interface 218 of FIG. 2A, a packet processing engine 310, a QoS engine 320, a jitterless compressor 330, a link quality estimator 340, a link switcher 350, a policy engine 360, and a cache manager 370. Although FIG. 3 depicts network interfaces 218A-218N as two network interfaces, it is appreciated that interfaces 218A-218N can include any number of network interfaces.

Packet processing engine 310, which is also referred to as a "packet engine," a "packet processor," or a "data processor," is responsible for controlling and managing the processing of data packets received and transmitted by appliance 108 via network interfaces 218A-N. Packet processing engine 310 can be one or more modules, which can be one or more packaged functional hardware units designed for use with other components or a part of a program that performs a particular function (e.g., controlling and managing the processing of data packets), corresponding to the particular step of related functions. Packet processing engine 310 can be embodied as a single packet engine or any number of a plurality of packet engines that can operate at data link layer (layer 2), network layer (layer 3), or transport layer (layer 4) of a network protocol stack (e.g., such as the layers and protocols of the Open System Interconnection communications model). Packet processing engine 310 can be configured to accomplish some or all of the steps described herein after being executed by CPU 221 and/or QoS engine 320. In some aspects, the data packets can be carried over the data link layer via the Ethernet communication protocol, which can comprise any of the family of WAN or LAN protocols, such as those protocols covered by the IEEE 802.3. In other aspects, the network stack can have any type and form of wireless protocols, such as IEEE 802.11 and/or mobile internet protocols. In some embodiments, packet processing engine 310 intercepts or receives data packets at the network layer, such as via the IP communication protocol. In some embodiments, packet processing engine 310 can intercept or receive data packets at the transport layer, such as via the TCP communication protocols. Packet processing engine 310 can operate at any session or any application layer above the transport layer.

Packet processing engine 310 can include a buffer for queuing one or more data packets during processing of the data packets. Additionally, packet processing engine 310 can communicate via one or more communication protocols to transmit and receive a plurality of network data packets across one or more links via network interfaces 218A-N. The links can connect appliance 108 to appliance 108'. Packet processing engine 310 can be configured to acquire data regarding the flow and store, the acquired data in an operatively connected computer memory (e.g., compression history database). The sent and received data packets operating across one or more links can be considered "data flows" or "flows." In some embodiments, packet processing engine 310 can send packets or header information of the packets to QoS engine 320 to request QoS engine 320 to determine QoS characteristics of the packets, e.g., whether an application type of the packets is a jitter sensitive application or not. Jitter sensitive application can be determined based on information in the packet. For example, the packet can include at least one of: an application type field, a jitter sensitiveness indicator, and a data characteristics field. For example, application type field can include voice over IP application, video streaming, BBC, CNN, youtube, netflix, etc. Jitter sensitiveness indicator can indicate whether the packet contains jitter sensitive data, and can have boolean (e.g., yes or no) information. Data characteristics field can indicate whether the packet has realtime or non-realtime characteristics. Data characteristics field can also indicate video or audio characteristics.

During operations of appliance 108, packet processing engine 310 can interface, be integrated with, or be in communication with any portion of appliance 108, such as QoS engine 320, jitterless compressor 330, link quality estimator 340, link switcher 350, policy engine 360, and/or cache manager 370. As such, any of the logic, functions, or operations of QoS engine 320, jitterless compressor 330, link quality estimator 340, link switcher 350, policy engine 360, and/or cache manager 370 can be performed in conjunction with or in responsive to packet processing engine 310. Packet processing engine 310 can be controlled by and/or execute any operation described herein.

QoS engine 320, which is also referred to as a "QoS controller," or a "QoS packet scheduler," can perform one or more QoS optimization techniques for jitter sensitive applications, etc. QoS engine 320 can be one or more modules, which can be one or more packaged functional software and/or hardware units designed for use with other components or a part of a program that performs a particular function (e.g., optimization techniques), corresponding to the particular step of related functions. QoS engine 320 can be configured to improve the performance, operation, or quality of service of any type of network traffic. QoS engine 320 performs these techniques, for example, by using defined logic, business rules, functions, or operations. In some embodiments, QoS engine 320 can perform network traffic optimization and management mechanisms that provide different priorities to different users, applications, flows, or links. QoS engine 320 can also control, maintain, or assure a certain level of performance to a user, application, flow, or connection. When receiving packets or header information of the packets from packet processing engine 310, QoS engine 320 can determine whether an application type of the packets is a jitter sensitive application or not and send such determined information to jitterless compressor 330. QoS engine 320 can direct link quality estimator 340 to perform any or all steps for determining one or more link quality. For example, QoS engine 320 can control, maintain, prioritize and/or assure a certain portion of bandwidth or network capacity of a communication link for a user, application, one or more flows, or links, collect data in connection with one or more flows and links, analyze the collected data, allocate or instruct to allocate optimal bandwidth over certain network link. QoS engine 320 can observe traffic behaviors and user behaviors, and based on the traffic and user behaviors, determine relative allocation of bandwidth over network links.

In some embodiments, QoS engine 320 can monitor the achieved level of performance or the quality of service (e.g., the data rate, delay, dropped packets, etc.) corresponding to a user, application, flow, and/or link, and then dynamically control or adjust one or more packet characteristics in connection with sending and receiving data packets to achieve a desired level of performance or quality of service. QoS engine 320 can coordinate the acquisition and delivery of packet characteristics with packet processing engine 310. QoS engine 320 can also coordinate the acquisition and delivery of link characteristics between components of appliance 108, for example, between packet processing engine 310, jitterless compressor 330, and link quality estimator 340. QoS engine 320 can direct link quality estimator 340 to perform some or all of the steps according to exemplary embodiments disclosed herein. For example, QoS engine 320 can determine whether an application type of the packets is a jitter sensitive application. QoS engine 320 can determine jitter sensitive application based on information in the packet. For example, the packet can include at least one of: an application type field, a jitter sensitiveness indicator, and a data characteristics field. For example, application type field can include voice over IP application, video streaming, etc. Jitter sensitiveness can be determined by QoS engine 320 based on the application. Data characteristics field can indicate whether the packet has realtime or non-realtime characteristics. Data characteristics field can also indicate video or audio characteristics. QoS engine 320 can provide jitterless compressor 330 with the information that the application type of packets is a jitter sensitive application.

Jitterless compressor 330 can include any logic, rules, functions, or operations for determining a number of packets to be transmitted over a link based on a packet size associated with accumulated packets and bandwidth of another link, or any other function or operation performed by appliance 108. Jitterless compressor 330 can include a buffer for queuing one or more data packets during processing of the data packets. Jitterless compressor 330 can receive packets from packet processing engine 310 or QoS engine 320. Jitterless compressor 330 can also receive application type information of packets from QoS engine 320. Jitterless compressor 330 can receive link quality information from link quality estimator 340 such as minimum latency, currently measured latency, and bandwidth over each network link, for example, between two appliances 108 and 108'. Based on inputs from QoS engine 320 and link quality estimator 340, jitterless compressor 330 can determine which packets have to be sent through one or more selected links. In particular, jitterless compressor 330 can determine which train of packets is to be sent through a low latency link or a higher latency link.

Assuming that there are packets to be transmitted from an appliance 108 to another appliance 108', there are two links chosen between the two appliances 108 and 108', jitterless compressor 330 can send (or provide an instruction to send) a first packet over a link (e.g., a second link) with higher latency than another link (e.g., a first link). Jitterless compressor 330 can also be configured to accumulate packets for an entire time period or a portion of the entire time period associated with a difference in latency between the second link and the first link. In some embodiments, jitterless compressor 330 can be configured to determine an optimal time period associated with a difference in latency between the second link and the first link for coordinating the sending of the first packet over the second link and of an acquired number of packets over the first link so that the first packet and the acquired number of packets arrive at the same time or almost at the same time.

For example, in the scenario where the latency and bandwidth on the first link is T1 and B1, respectively, and the latency and bandwidth on the second link is T2 and B2, respectively, it is assumed that the latency of T2 is greater than T1. To maintain jitterless packet transfer for the connection, the first packet is sent through the second link, which has a higher latency than the first link. Jitterless compressor 330 can compress the subsequent designated packets by accumulating them based on a maximum time of ((Packet size)/B1)<(T2-T1). In other words, jitterless compressor 330 can accumulate packets for a time period of the latency difference between the two links, and thus it is ensured that the packets arrive in appliance 108' on both links at the same time or almost at the same time. After accumulating the packets on the first link and for the time ((Packet size)/B1)<(T2-T1), the next packet is sent on the second link and the process continues.

Jitterless compressor 330 can be configured to determine a number of packets based on a packet size associated with the accumulated packets and bandwidth of the first link. Using the determination above, assuming that T1=60 ms, B1=10 Mbps, T2=100 ms, B2=15 Mbps, and the average packet size is 1500 bytes, jitterless compressor 330 can determine a number of packets to be transmitted over the first link (N) based on the following determination:

(Packet size)/$B1$<($T2$−$T1$), ($N$*1500*8)/10*$10^6$<(100 ms−60 ms), ($N$*1500*8)/10*$10^6$=80% of 40 ms, $N$*12*$10^{-4}$=320*$10^{-4}$ $N$=320/12=26 packets In the above example, it is appreciated that 80% of the difference in latency is taken into account for any differences/errors in transmission delay. It is also possible to apply other percentages as the difference in latency based on various factors. Factors can include for example, radio or link condition, network congestion status, available bandwidth, round trip time, etc. Depending on a determined percentage of the difference in latency, a first packet over a link and any one of subsequent packets (e.g., 26 packets from the above example) over another link can arrive at the other appliance 108' at the same time or almost at the same time. The key is to minimize the gap of arrival time of the first packet over a link and any one of subsequent packets over another link.

Jitterless compressor 330 can determine when to perform determination of a number of packets to be transmitted on a link. In some embodiments, jitterless compressor 330 can determine a number of packets to be transmitted on a link each round. From the example above, the number of packets is determined, N=26. After transmitting 26 packets on the first link, jitterless compressor 330 can determine another number of packets to be transmitted on the first link. In other embodiments, jitterless compressor 330 can reuse a previously determined number of packets for certain rounds. This can be because there can be no much change on radio or link condition or round trip time, for example. For instance, when transmitting a large size of data such as a video clip, it can be packetized into a plurality of packets (e.g., 200 packets). From the example above, the number of packets is determined, N=26. Jitterless compressor 330 can transmit the first packet, which can be noted as packet #1, on the second link and transmit packet #2-#27 on the first link. Jitterless compressor 330 can determine reusing the determined number of packets. After transmitting packet #2-#27 on the first link, jitterless compressor 330 can transmit packet #28 on the second link and packet #29-#54 on the first link, and can repeat this process.

Jitterless compressor 330 can compress the determined number of packets, such as 26 packets in the above example with 80% of the difference in latency. Jitterless compressor 330 can instruct link switcher 350 to transmit the compressed packets over the first link.

Link quality estimator 340 can include any logic, rules, functions, or operations for measuring and providing latency and bandwidth over a link, or any other function or operation performed by appliance 108. Link quality estimator 340 can identify a number of network links. Link quality estimator 340 can also choose a link among a number of network links to transmit one or more packets. Link quality estimator 340 can measure latency over each link. Link quality estimator 340 can measure minimum latency over each link or overall links. Link quality estimator 340 can measure bandwidth of each link. Link quality estimator 340 can provide measured minimum latency and current latency information on each link, and bandwidth information on each link with jitterless compressor 330. In some embodiments, link quality estimator 340 receives and adjusts into a new bandwidth on a link after receiving bandwidth re-allocation instructions on the link from QoS engine 320.

Link switcher 350 can include any logic, rules, functions, or operations for determining a network link and providing transmission of one more packets, or any other function or operation performed by appliance 108. Link switcher 350 can acquire, from jitterless compressor 330, the determined number of packets that have been compressed. Link switcher 350 can also receive instructions from jitterless compressor 330 over which link the determined number of packets are to be transmitted. Using those instructions, link switcher 350 can transmit a first packet over the link that has higher latency than the other link. Link switcher 350 can transmit the acquired number of packets over the first link, such as the 26 packets in the above example with 80% of the difference in latency. In some embodiment, link switcher 350 can transmit a next packet over the second link, after transmitting the acquired number of packets over the first link. Link switcher 350 can transmit the next predetermined number of packets that have been compressed over the first link.

Appliance 108 can also include a policy engine 360, also referred to as a policy controller or a policy provider. Policy engine 360 can be one or more modules and can include any logic, function, or operations for providing and applying one or more policies or rules to the function, operation, or configuration of any portion of the appliance 108. In some embodiments, policy engine 360 provides a configuration mechanism to allow a user to identify, specify, define, or configure a policy for appliance 108, or any portion thereof. For example, policy engine 360 can provide a predefined traffic optimization configuration policy including the number of priorities, the priorities associated with each service class, the number of connections allowed under each service class, link bandwidth configuration, and any other policy information. Policy engine 360 can also provide policies for what data to cache, when to cache the data, for whom to cache the data, when to expire an object in cache, or when to refresh the cache. Policy engine 360 can also include any logic, rules, functions, or operations for determining and providing access, control, and management of data packets received and stored by packet processing engine 310. Policy engine 360 can also include any logic, rules, functions, or operations for determining and providing access, control and management of security, network traffic, network access, compression, or any other function or operation performed by appliance 108.

Cache manager 370 is one or more modules configured to store data, information, and objects to a cache in memory or storage, to provide cache access, and to control and manage the cache. The data, objects, or content processed and stored by cache manager 370 can include data in any format, such as a six-byte MAC address, a data packet, or any type of data communicated via any communication protocol. Examples of types of data can include, for example, one or more priority information of data in any incoming connection request. Examples of types of data can also include, for example, one or more priority information of a connection conveying data. Examples of types of data can also include, for example, one or more packet characteristics including information in connection with packet loss rates, queuing delays, flow congestion, sizes of congestion windows, minimum latency, measured latency of one or more links, bandwidth of one or more links, average round trip times, etc. Cache manager 370 can save data and/or a link pointing to a stored location of the data in a fast-access cache memory, such as cache 240. In some embodiments, cache manager 370 can duplicate original data stored in a slow-access storage and store the data in a fast-access cache memory, such as cache 240. After the data is stored in the cache, future use can be made by accessing the cached copy rather than refetching or recomputing the original data, thereby reducing the access time. In some embodiments, the cache can comprise a data object in memory of appliance 108. In some embodiments, the cache can comprise any type and form of storage element of appliance 108, such as a portion of a hard disk. In some embodiments, as described above, the processing unit of the device, such as CPU 221, can provide cache memory for use by cache manager 350. Cache manager 370 can use any portion and combination of main memory 222, storage 228, or CPU 221 for caching data, objects, and other content. Cache manager 370 can comprise any type of general purpose processor (GPP), or any other type of integrated circuit, such as a Field Programmable Gate Array (FPGA), Programmable Logic Device (PLD), or Application Specific Integrated Circuit (ASIC).

Figure 4:
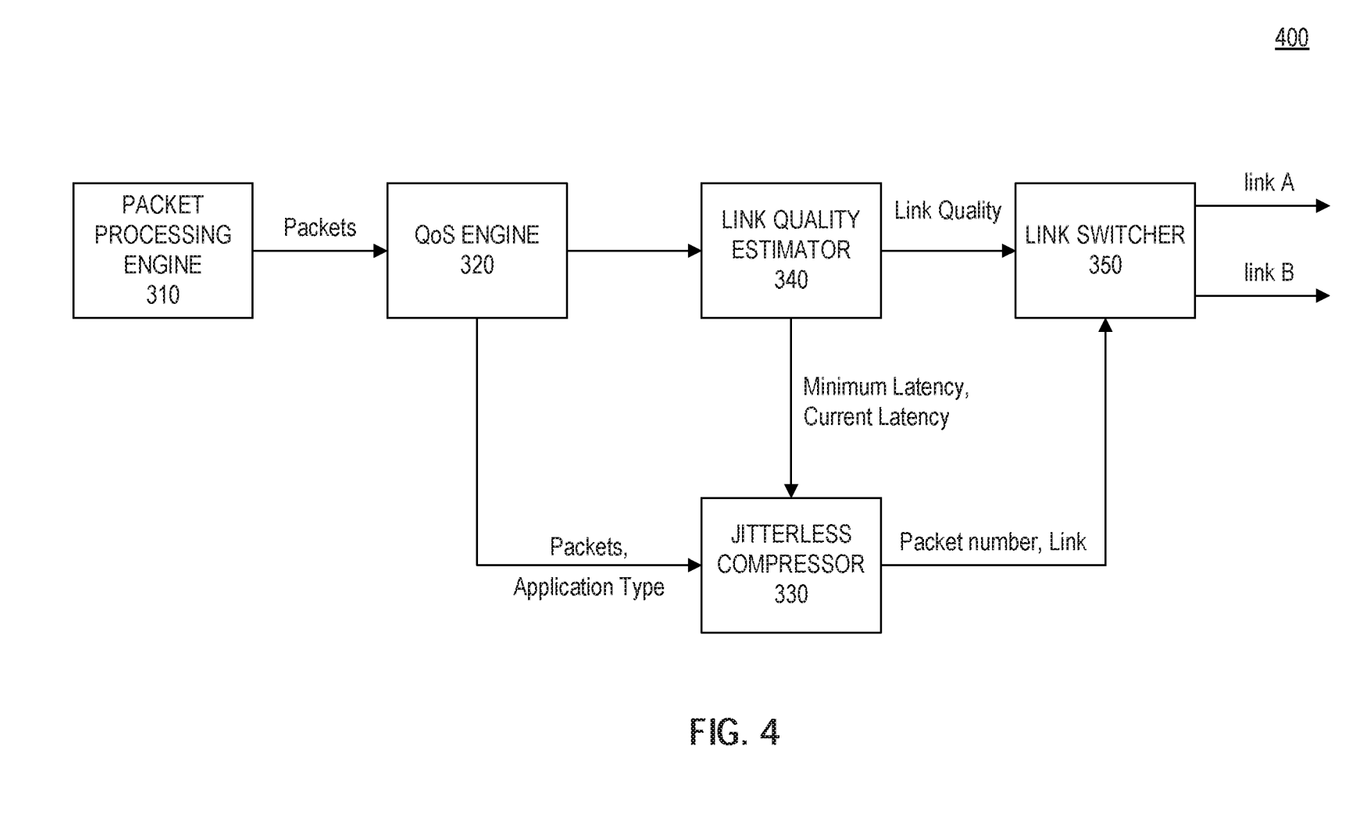
FIG. 4 is a block diagram of an exemplary embodiment of determining a number of packets to be transmitted over a second link based on a packet size associated with accumulated packets and bandwidth of a first link, consistent with embodiments of the present disclosure.

FIG. 4 is a block diagram of an exemplary embodiment of determining a number of packets to be transmitted over a second link based on a packet size associated with accumulated packets and bandwidth of a first link, consistent with embodiments of the present disclosure.

Packet processing engine 310 can send packets or header information of the packets to QoS engine 320 to request that QoS engine 320 determine QoS characteristics of the packets, e.g., whether an application type of the packets is a jitter sensitive application or not. When QoS engine 320 determines that the application type of the packets is a jitter sensitive application, QoS engine 320 can provide the application-type information to jitterless compressor 330. Link quality estimator 340 can measure minimum latency, current latency over each link, and bandwidth over each link and provide the measured information to jitterless compressor 330.

Based on the received information from QoS engine 320 and link quality estimator 340, jitterless compressor 330 can determine a number of packets to be transmitted over a link based on a packet size associated with the accumulated packets and bandwidth of another link. Assuming that there are packets to be transmitted from an appliance 108 to another appliance 108' and that there are two links chosen between the two appliances 108 and 108', jitterless compressor 330 can send a first packet over a link (e.g., link B, 510) with higher latency than another link (e.g., link A, 520). Jitterless compressor 330 can also be configured to accumulate packets for an entire time period or a portion of the entire time period associated with a difference in latency between link A and link B. Jitterless compressor 330 can be configured to determine an optimal time period associated with a difference in latency between link A and link B in order to make the first packet over link B and an acquired number of packets over link A arrived at the same time or almost at the same time. For example, let latency and bandwidth on link A be T1 and B1 and for link B be T2 and B2, respectively. Let the latency T2>T1. In order to maintain jitterless packet transfer for the connection, the first packet is sent through link B, which has higher latency than link A. Then, jitterless compressor 330 can compress the packets by accumulating them for a maximum time of ((Packet size)/B1)<(T2−T1). In other words, jitterless compressor 330 can accumulate packets for a time period of the latency difference between the two links (e.g., link A and link B), allowing appliance to send the compressed packets so that the first packet and the compressed packets arrive in appliance 108' on both links at the same time or almost at the same time. Since the compressed packets are sent on a second link (e.g., link A) with a time difference of (T2−T1), the first packet and the compressed packets can arrive in appliance 108' at the same time or almost at the same time. Jitterless compressor 330 can repeat this process by accumulating packets for the time ((Packet size)/B1)<(T2−T1), and providing instructions to link switcher 350 to transmit a next first packet on link B and compressed subsequent packets on link A. In exemplary embodiments, assuming that latency and bandwidth on link A be T1=60 ms and B1=10 Mbps and for link B be T2=100 ms and B2=15 Mbps, average packet size be 1500 bytes, and 80% of the difference in latency for transmission delay, jitterless compressor 330 can determine 26 packets to be transmitted over link A. Although 80% of the difference in latency is taken into account for transmission delay in this assumption, it is also possible to apply other percentages as the difference in latency based on various factors. Factors can include for example, link condition, network congestion status, available bandwidth, round trip time, etc. Depending on a determined percentage of the difference in latency, the first packet over a link and any one of subsequent packets over another link can arrive at the other appliance 108' at the same time or almost at the same time. The key is to minimize the gap of arrival time of the first packet over a link and any one of subsequent packets over another link. Jitterless compressor 330 can compress the determined number of packets and can instruct link switcher 350 to transmit the compressed packets over link A.

Figure 5:
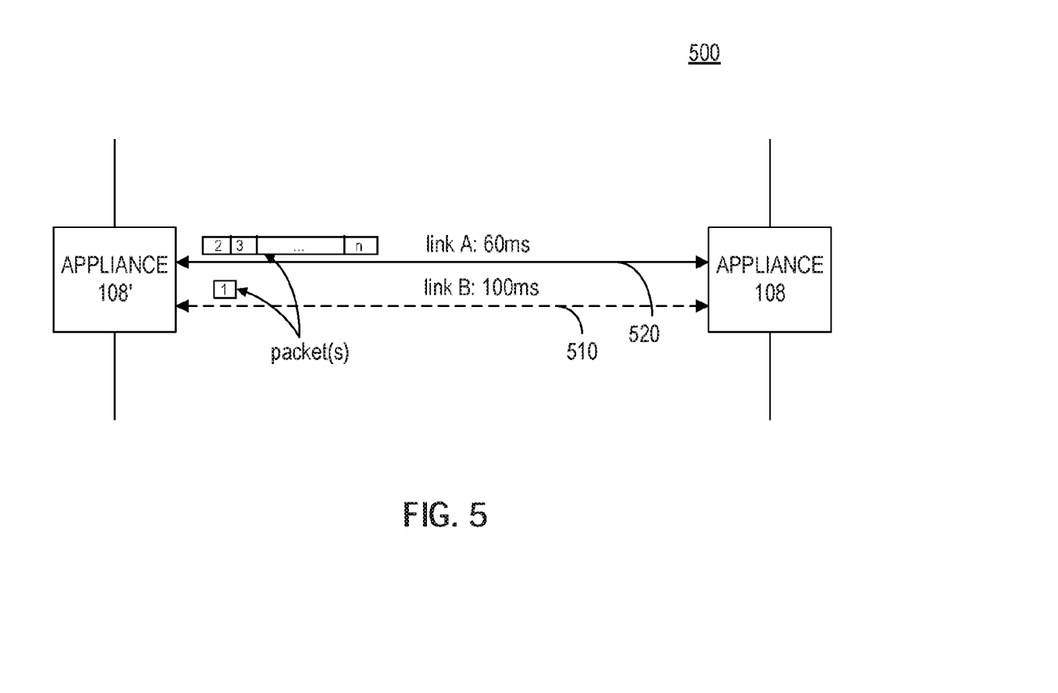
FIG. 5 is a block diagram of an exemplary embodiment of transmitting a first packet over a link and an acquired number of packets over another link, consistent with embodiments of the present disclosure.

FIG. 5 is a block diagram of an exemplary embodiment of transmitting a first packet over a link and an acquired number of packets over another link, consistent with embodiments of the present disclosure. As an example, FIG. 5 shows that there are a plurality of packets (e.g., n number of packets) to be transmitted over two links between appliance 108 and appliance 108'. The two links include link A 520 and link B 510. Link B 510 (e.g., 100 ms latency) has a longer latency than link A 520 (e.g., 60 ms latency). Although FIG. 5 shows two links between the appliances 108 and 108', it is also possible that more than two links can be used to transmit a plurality of packets between them to make the plurality of packets arrived at appliance 108' at the same time or almost at the same time.

Appliance 108 can send a first packet over link B 510 having a longer latency than link A 520. Appliance 108 can accumulate packets for an entire time period or a portion of the entire time period of the latency difference between the two links, and thus it is ensured that the packets arrive in appliance 108' on both links at the same time or almost at the same time. Appliance 108 can determine a number of packets (e.g., (n−1) number of packets as exampled in FIG. 5) based on a packet size associated with the accumulated packets and bandwidth of link A 520. Appliance 108 can compress the determined number of packets and transmit the compressed packets over link A 520. Then, the first packet and the compressed (n−1) number of packets arrive at appliance 108' at the same time or almost at the same time and this thus induces no additional jitter or minimum jitter. Packets can arrive out of order at appliance 108'. Appliance 108' can re-order received packets based on sequence number of each packet. Upon receipt of the compressed (n−1) number of packets, appliance 108' can decompress, re-order, and send the packets to the other end (e.g., a public server).

Figure 6:
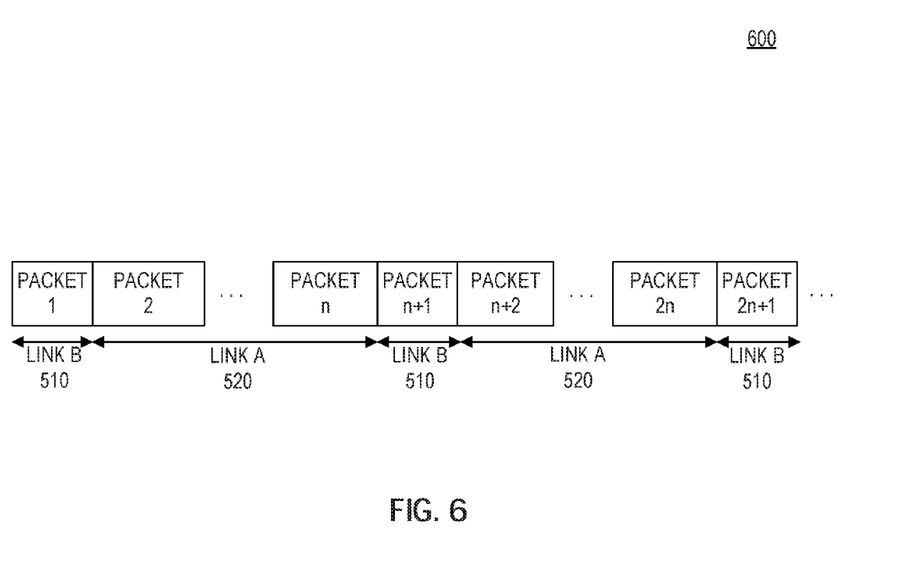
FIG. 6 is a block diagram of an exemplary embodiment of determining and transmitting a plurality of determined packets over one or another link, consistent with embodiments of the present disclosure.

FIG. 6 is a block diagram of an exemplary embodiment of determining and transmitting a plurality of determined packets over one or another link, consistent with embodiments of the present disclosure. FIG. 6 shows a plurality of packets (e.g., (2n+1) number of packets) to be transmitted over the two links, e.g., link B 510 and link A 520. As described above in FIG. 5, the first packet is transmitted over link B 510, and (n−1) number of packets (e.g., packet 2~packet n) is determined based on a packet size associated with the accumulated packets and bandwidth of link A 520. Packet 2-packet n are compressed and transmitted over link A 520. After accumulating packets on link A 520 and for the time ((Packet size)/bandwidth of link A<latency difference between link A and link B), the next packet, packet n+1, is transmitted over link B 510. Packet n+2~packet 2n are compressed and transmitted over link A 520. After accumulating packets on link A 520 and for the time ((Packet size)/bandwidth of link A)<latency difference between link A and link B, the next packet, packet 2n+1, is transmitted over link B 510. The latency is re-computed and this operation runs continuously.

For example, assuming that latency and bandwidth on link A 520 be T1=60 ms and B1=10 Mbps and for link B be T2=100 ms and B2=15 Mbps, average packet size be 1500 bytes, and 80% of the difference in latency for transmission delay, it is determined that 26 packets are to be transmitted over link A 520 and thus n becomes 27. Packet 1 is transmitted over link B 510 and 26 packets which are packet 2-packet 27 are compressed and transmitted over link A 520. Then, packet 28 is transmitted over link B 510 and 26 packets which are packet 29~packet 54 are compressed and transmitted over link A 520. The latency is re-computed and this operation runs continuously.

Figure 7:
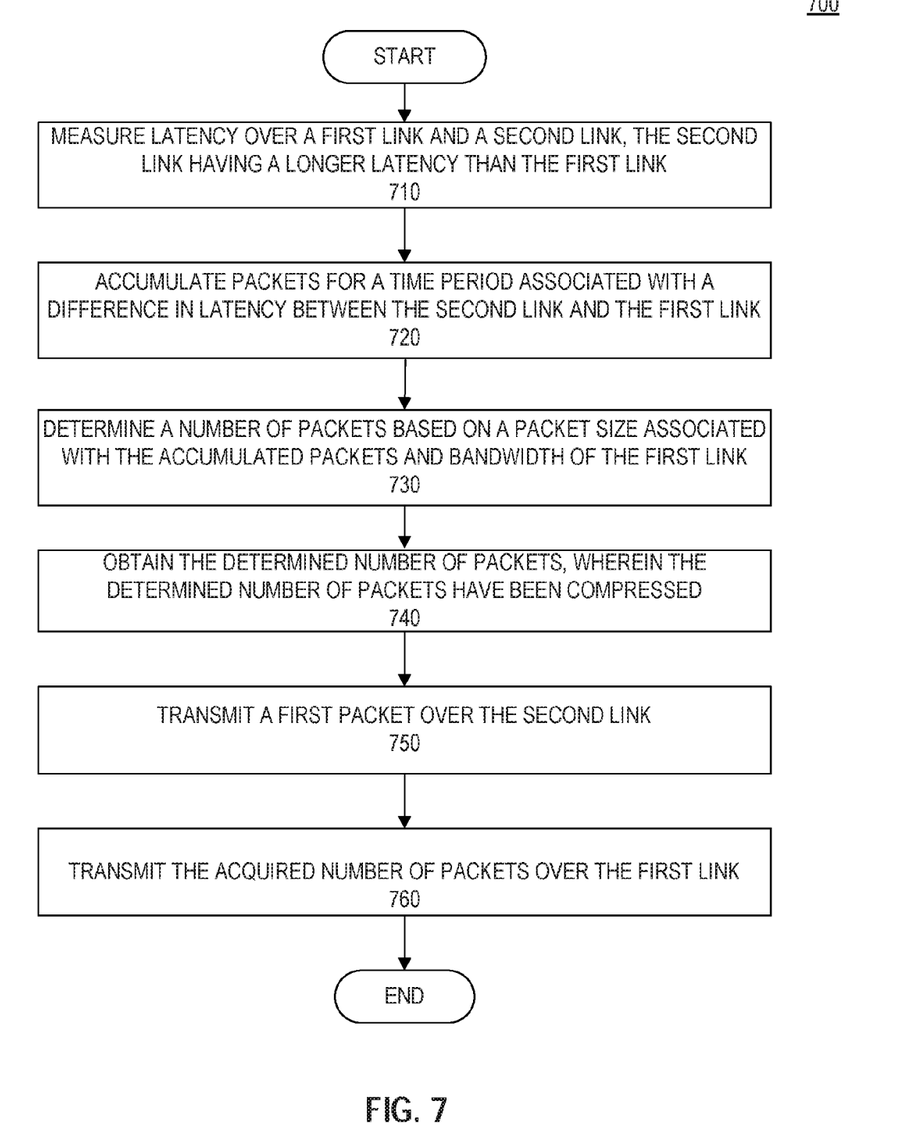
FIG. 7 is a block diagram of an exemplary method of providing compression technique through multiple network links, consistent with embodiments of the present disclosure.

FIG. 7 is a block diagram of an exemplary method of providing compression technique through multiple network links, consistent with embodiments of the present disclosure. It will be readily appreciated that the illustrated procedure can be altered to change one or more steps in order, delete steps or further include additional steps. While method 700 is described as being performed by an appliance (e.g., appliance 108), it is appreciated that method 700 can be performed by other devices alone or in combination with the appliance.

As an initial step 710, appliance 108 can measure latency over a first link and a second link. The second link can have a longer latency than the first link. For example, the second link can have 100 ms latency and the first link can have 60 ms latency. At step 720, appliance 108 can accumulate packets for an entire time period or a portion of the entire time period associated with a difference in latency between the second link and the first link. This is to achieve no additional jitter or minimum jitter by making a first packet over the second link and a number of packets over the first link arrived in the other appliance 108' at the same time or almost at the same time.

At step 730, appliance 108 can determine a number of packets based on a packet size associated with the accumulated packets and bandwidth of the first link. For example, assuming that bandwidth on the first link be 10 Mbps, average packet size of the accumulated packets are 1500 bytes, and 80% of the difference in latency for transmission delay, appliance 108 can determine 26 packets to be transmitted over the first link based on the following calculation:

$$(N*1500*8)/10*10^6 = 80\% * (100\ ms - 60\ ms),$$

$$N = 26.$$

At step 740, appliance 108 can obtain the determined number of packets, which can be compressed. In the above-example at step 730, appliance 108 obtains and compresses 26 packets to be transmitted over the first link.

Appliance 108 can transmit a first packet over the second link at step 750 and transmit the acquired number of packets over the first link at step 760. In the above-example at step 730, appliance 108 transmits the 26 packets that have been compressed over the first link. After transmission, appliance 108 can measure latency over the first link and the second link. Appliance 108 can send the first packet over the second link and the acquired number of packets over the first link so that they arrive at the other appliance 108' at the same time or almost at the same time. This induces no additional jitter or minimum jitter on a system. The methods in FIG. 7 can be run continuously until no more packets are accumulated at appliance 108.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance having one or more processors and comprising:
   a link quality estimator configured to measure latency over a first link and a second link, wherein the second link has a longer latency than the first link;
   a jitterless compressor configured to:
      accumulate packets for a time period associated with a difference in latency between the second link and the first link;
      determine a number of packets based on a packet size associated with the accumulated packets and bandwidth of the first link;
   a link switcher configured to:
      acquire the determined number of packets, wherein the determined number of packets have been compressed;
      transmit a first packet over the second link; and
      transmit the acquired number of packets over the first link.

2. The appliance of claim 1, wherein the link quality estimator is further configured to measure link quality, wherein the link quality includes bandwidth over each link.

3. The appliance of claim 1, wherein the link quality estimator is further configured to measure minimum latency over the first link and the second link.

4. The appliance of claim 1, wherein the jitterless compressor is further configured to determine an optimal time period associated with a difference in latency between the second link and the first link in order to make the first packet over the second link and the acquired number of packets over the first link arrived at the same time.

5. The appliance of claim 1, wherein the link switcher is further configured to transmit a next packet over the second link, after transmitting the acquired number of packets over the first link.

6. The appliance of claim 5, wherein the link switcher is further configured to transmit next packets in a unit of the determined number of packets over the first link.

7. The appliance of claim 1, further comprises a quality of service engine configured to determine whether an application type of the packets is a jitter sensitive application.

8. A method of providing compression technique for jitter sensitive application, the method comprising:
   measuring latency over a first link and a second link, wherein the second link has a longer latency than the first link;
   accumulating packets for a time period associated with a difference in latency between the second link and the first link;
   determining a number of packets based on a packet size associated with the accumulated packets and bandwidth of the first link;
   acquiring the determined number of packets, wherein the determined number of packets have been compressed;
   transmitting a first packet over the second link; and
   transmitting the acquired number of packets over the first link.

9. The method of claim 8, further comprising measuring link quality, wherein the link quality includes bandwidth over each link.

10. The method of claim 8, further comprising measuring minimum latency over the first link and the second link.

11. The method of claim 8, further comprising determining an optimal time period associated with a difference in latency between the second link and the first link in order to make the first packet over the second link and the acquired number of packets over the first link arrived at the same time.

12. The method of claim 8, further comprising transmitting a next packet over the second link, after transmitting the acquired number of packets over the first link.

13. The method of claim 12, further comprising transmitting next packets in a unit of the determined number of packets over the first link.

14. The method of claim 8, further comprising determining whether an application type of the packets is a jitter sensitive application.

15. A non-transitory computer readable storage medium that stores a set of instructions that are executable by at least one processor of an appliance to cause the appliance to perform a method of providing compression technique for jitter sensitive application, the method comprising:
   measuring latency over a first link and a second link, wherein the second link has a longer latency than the first link;
   accumulating packets for a time period associated with a difference in latency between the second link and the first link;
   determining a number of packets based on a packet size associated with the accumulated packets and bandwidth of the first link
   acquiring the determined number of packets, wherein the determined number of packets have been compressed;
   transmitting a first packet over the second link; and
   transmitting the acquired number of packets over the first link.

16. The non-transitory computer readable storage medium of claim 15, the method further comprising measuring link quality, wherein the link quality includes bandwidth over each link.

17. The non-transitory computer readable storage medium of claim 15, the method further comprising measuring minimum latency over the first link and the second link.

18. The non-transitory computer readable storage medium of claim 15, the method further comprising determining an optimal time period associated with a difference in latency between the second link and the first link in order to make the first packet over the second link and the acquired number of packets over the first link arrived at the same time.

19. The non-transitory computer readable storage medium of claim 15, the method further comprising transmitting a next packet over the second link, after transmitting the acquired number of packets over the first link.

20. The non-transitory computer readable storage medium of claim 19, the method further comprising transmitting next packets in a unit of the determined number of packets over the first link.

* * * * *